United States Patent [19]
Kakuta et al.

[11] 4,260,033
[45] Apr. 7, 1981

[54] BODY WEIGHING MACHINE

[75] Inventors: Toshihiro Kakuta, Akashi; Kunio Iwasaka, Kakogawa, both of Japan

[73] Assignee: Yamato Scale Company Limited, Hyogo, Japan

[21] Appl. No.: 16,728

[22] Filed: Mar. 2, 1979

[30] Foreign Application Priority Data

Aug. 30, 1978 [JP] Japan .................................. 53-106755

[51] Int. Cl.³ ...................... G01G 19/44; G01G 19/41
[52] U.S. Cl. ........................................ 177/34; 177/245
[58] Field of Search ....................... 177/245, 25, 30–34; 364/567; 235/78 R, 88 R

[56] References Cited

U.S. PATENT DOCUMENTS

| | | | |
|---|---|---|---|
| 2,913,238 | 11/1959 | Tommeruik | 177/25 |
| 3,572,584 | 3/1971 | Weaver | 235/88 R |
| 3,866,699 | 2/1975 | Soehnle | 177/245 X |
| 4,048,477 | 9/1977 | Hungerford | 235/78 R X |
| 4,113,039 | 9/1978 | Ozaki | 177/25 |

*Primary Examiner*—Joseph W. Hartary
*Attorney, Agent, or Firm*—Eugene E. Geoffrey, Jr.

[57] ABSTRACT

Weighing apparatus for indicating weight which includes a scale for body weight, a calorie scale carried by the body weight scale, standard weight setting scale coordinated with the calorie scale so that a calorie intake will be indicated to lower or raise the body weight to bring it to the standard weight and an exercise scale for indicating amount of exercise and coordinated with the calorie scale to modify the calorie intake in accordance with the calories utilized as a result of the exercise.

4 Claims, 6 Drawing Figures

BODY WEIGHING MACHINE

This invention relates to a body weighing machine which is sometimes referred to as a "health meter" or "bath scale" and more particularly to a novel and improved indicating means which can give not only the measured weight of the body but also the diet calories to be taken every day in order to proceed to the standard or ideal weight.

Some of the prior art body weighing machines are arranged to indicate, in addition to the weight of the body, the body form such as "fatty", "normal" or "skinny", or its deviation from the standard or ideal weight, by presetting the height or standard weight in the machine. Furthermore, it is well known that the weight of the body can be controlled by controlling the daily diet calorie intake and that the diet calories can be consumed and voided partly by daily physical exercise such as running. In order to effectively or conveniently utilize the body weighing machines for health control, it is desired to have weighing machines which can directly and automatically indicate the preferred daily diet calorie intake corresponding to the measured weight of the body.

Accordingly, an object of this invention is to provide a body weighing machine which can directly and automatically indicate the diet calories to be taken every day in order to proceed to the standard or ideal weight.

Another object of this invention is to provide such a weighing machine with means for correcting the calorie indication in accordance with the quantity of daily physical exercise.

According to a feature of this invention, the body weighing machine comprises first setting means for presetting personal height or standard weight corresponding to the height and calorie indicating means for indicating daily diet calories to be taken for proceeding to the standard weight on the basis of the difference between the measured weight of the body and the standard weight preset by the first setting means.

According to another feature of this invention, the body weighing machine further comprises second setting means for presetting the quantity of daily exercise and correcting means operatively coupled to the first and second setting means for modifying the indication in accordance with the calories consumed by the daily exercise.

These and other objects and features of this invention will be described hereinunder in more detail with reference to the accompanying drawings.

IN THE DRAWINGS

Throughout the drawings, like reference numerals are used to denote like structural components.

Figure 1:
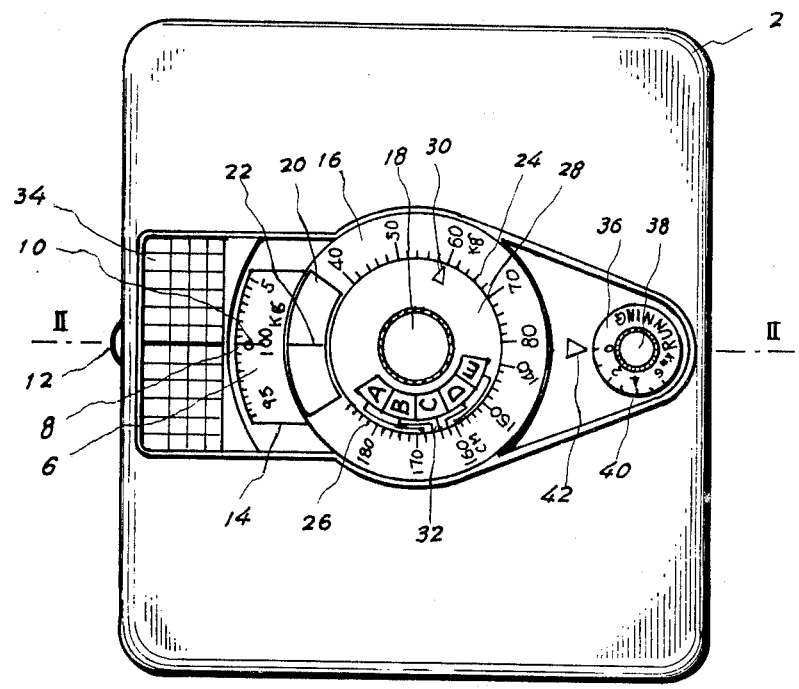
FIG. 1 is a plan view representing an embodiment of a body weighing machine according to this invention.
Figure 2:
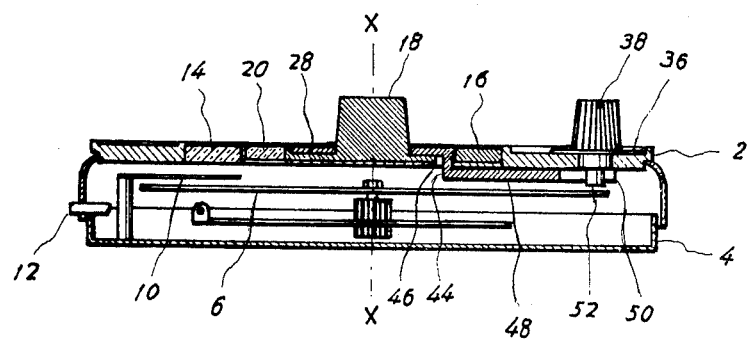
FIG. 2 is a cross sectional side view of the embodiment of FIG. 1 taken along the line 2—2 thereof.

In FIGS. 1 and 2 the embodiment of the body weighing machine in accordance with the invention has a platform 2 supported over a base 4 through a weighing mechanism (shown partly) as known in the art. The weighing mechanism includes a graduated disc 6 arranged to rotate about an axis X—X by an angle proportional to the weight of a person standing upon the platform 2. The graduated disc 6 has weight graduations 8 on the upper surface, from 0 to 100 kilograms in this embodiment and is accompanied with a pointer needle 10 and a zero adjusting knob 12, as in the case of prior art.

The platform 2 has a weight indication window 14 consisting of transparent material for viewing the graduations 8 on the disc 6 and the pointer needle 10 therethrough. A dial 16 having a central knob 18 is retained in a circular aperture formed in the platform 2 and arranged to rotate about the axis X—X. The dial 16 has a calorie indication window 20 having a pointer line 22 for viewing calorie graduations which are provided on the graduated disc 6 and will be described later in conjunction with FIGS. 3 through 6. The dial 16 has two kinds of graduations thereon, one being standard weight graduations 24 and the other being height graduations 26. Angular dispositions of both graduations 24 and 26 are determined on the basis of correlation between the height and ideal weight of a normal person, which has been well known in the field of health control and sanitation, while the angular disposition of the standard weight graduations 24 is the same as those of the weight graduations 8 on the disc 6.

A ring dial 28 is retained in a concentric annular groove in the dial 16 so that it can rotate about the axis X—X with respect to the dial 16. The ring dial 28 has a pointer mark 30 facing the standard weight graduations 24 and five pointer marks 32 facing to the height graduations 26 and respectively corresponding to five classes A, B, C, D and E of the body form classification which will be described later. A body form classification table 34 used for selecting the height pointer marks 32 is also attached on the platform 2 and will be described later. The marks 30 and 32 are disposed in a manner that the mark 30 points to the standard weight of a person when the height pointer mark 32 corresponding to his body form points his height.

Another dial 36 having a knob 38 and running distance graduations 40 is attached to the platform 2 so as to rotate about another axis apart from the axis X—X. Another pointer mark 42 is provided on the platform, facing the graduations 40. As shown also in broken lines in FIG. 3, the ring dial 28 has a short downward projection 44 extending through an arcuate aperture 46 in the dial 16 and connected at the lower end with a horizontal arm 48. The arm 48 includes a forked free end 50 and an eccentric pin 52 extending downwards from the dial 36 engages the forked end 50, so that the ring dial 28 can be angularly shifted with rotation of the dial 36. The graduations 40 and the pointer marks 30 are disposed, when the pointer mark 42 points the zero point of the graduations 40 and the pointer line 22 is aligned with the pointer needle 10, so the pointer mark 30 can point the average standard weight, 60 kilograms in this embodiment, which is well known by those skilled in the art.

Figure 3:
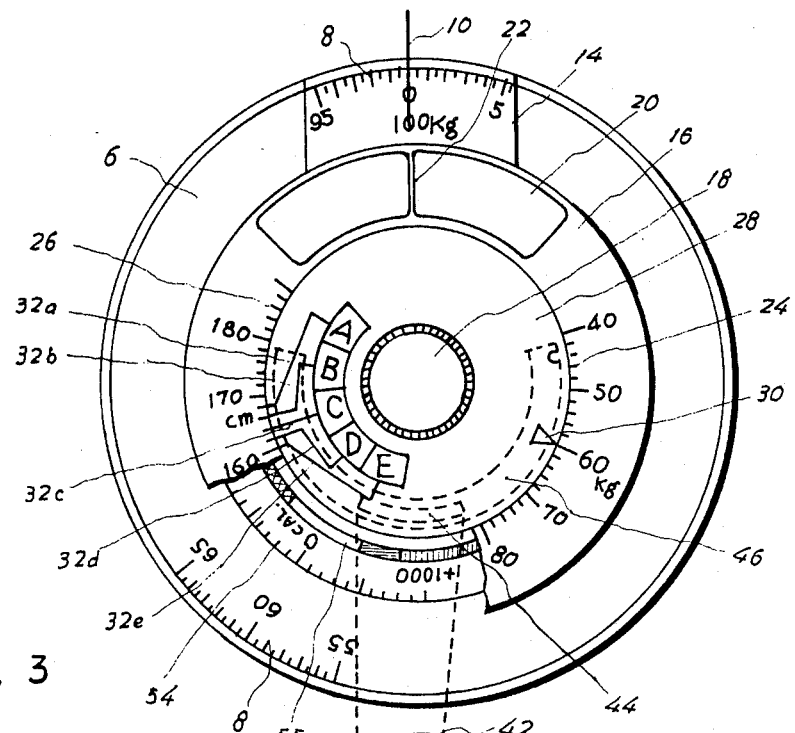
FIG. 3 is a partly broken-away enlarged plan view representing a main portion of the embodiment of FIG. 1; and, FIGS. 4 through 6 are plan views representing a part of the main portion of FIG. 3 in various statuses and given for an aid in the explanation of the operation of the embodiment.

As shown in FIG. 3, the graduated disc 6 also carries calorie graduations 54 in parallel relationship with the weight graduations 8 on part thereof. (The weight graduations 8 are shown only in part in FIG. 3 for the purpose of simplicity, though they are provided throughout the periphery of the disc 6). The calorie graduations 54 have their zero point in the middle, facing to the average standard weight graduation, that is, 60 kilograms in this embodiment, and positive and negative graduations in both sides thereof. The calorie graduations 54 are determined so that 100 calories corresponds to 1 kilogram of weight in accordance with a general rule, which is well known in this field and that the diet calories required for increasing or decreasing weight of the body by 1 kilogram is about 100 calories. The graduated disc 6 further carries a colored ring 55 for indicating the degrees of excess and shortage of the present diet calories.

The graduations 40 of the dial 36 are determined so that the pointer mark 30 is shifted by 1 kilogram along the weight graduations 24 when the dial 36 is rotated by 3 kilometers of the distance graduations 40. This is according to another general rule, known in this field, that about 100 calories will be consumed by each 3 kilometers run at normal speed by a person weighing 60 kilograms.

Although the ideal or standard weight of the body of a person is a function of his height, it is also a function of its age and sex. Therefore, it is necessary to make a correction for age and sex when one uses this weighing machine on the basis of its height. The classification table 34 shown in FIG. 1 is used for this purpose, and an example of its content is shown in the following table 1.

TABLE 1

Body Form Classification

| 20 to 24 | 25 to 29 | 30 to 39 | 40 to 49 | 50 to 59 | WOMAN | MAN | 20 to 24 | 25 to 29 | 30 to 39 | 40 to 49 | 50 to 59 |
|---|---|---|---|---|---|---|---|---|---|---|---|
| A | A | B | B | B | SKINNY | | B | B | C | C | C |
| B | B | C | C | C | NORMAL | | C | C | D | D | D |
| C | C | D | D | D | FATTY | | D | D | E | E | E |

This table was originally made by the present inventors, though it is not the invention of this application, by using a commercially available set of tables of standard or ideal weight of body with respect to every height for every age and sex, dividing equally the whole range of standard weight throughout the age and sex into five classes, A, B, C, D and E, and then putting the class to which the standard weight for each age and sex in the colum of "normal" and its upper and lower classes in the columns of "fatty" and "skinny", respectively.

The method of use of this embodiment of the invention will now be described in conjunction with some examples and with reference to FIGS. 3 through 6.

EXAMPLE 1

Figure 4:
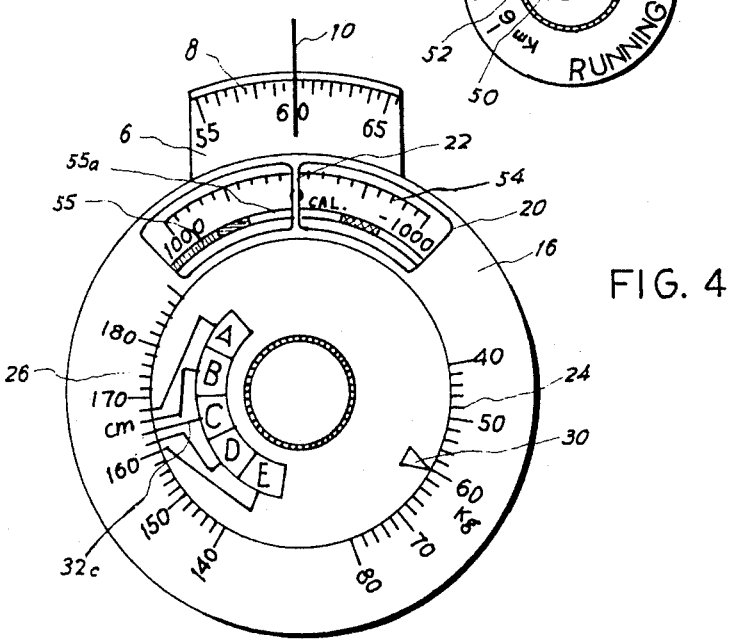

It is assumed that the person who is going to use this weighing machine is a man about twenty-five years old and 164 centimeters high, weighing 60 kilograms and having a "normal" body form. Then, the class of body form can be read out as "C" from the classification table 34 (FIG. 1), that is, TABLE 1. After setting the "running" dial 36 at "0" as shown in FIG. 3, the knob 18 is rotated to adjust "164 cm" of the height graduations 26 on the dial 16 to the body form pointer mark 32c on the ring dial 28. When the person stands upon the platform 2 of the machine, the graduated disc 6 rotates and the pointer needle 10 points to "60 kg" of the weight graduations 8 as shown in FIG. 4. It can be noted from this condition that he has just standard weight "60 kg" as pointed by the standard weight pointer mark 30 and that the diet calories which he is now taking is optimum and need not be changed, as the pointer line 22 of the window 20 points to "0 cal" of the calorie graduations 54 on the disc 6 and, also, it is in the region 55a of the colored ring 55, which indicates normal diet calories.

EXAMPLE 2

Figures 5, 6:
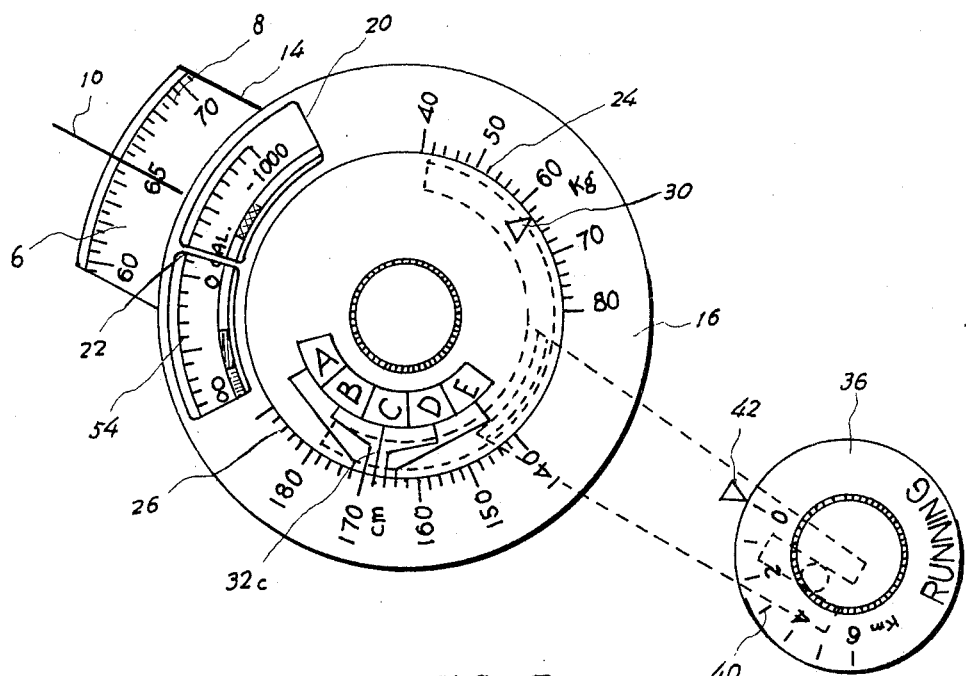

Assuming next that the person is a man of forty years of age and 168 centimeters high and has a "skinny" body form, the classification table 34 (TABLE 1) will teach that his body form belongs to Class "C". After setting the running dial 36 at "0 km" as shown in FIG. 5, the dial 16 is adjusted to cause the body form mark 32c to point "168 cm" of the height graduations 26. Then, the standard weight mark 30 will point his standard weight "63.3 kg". Assuming that the pointer needle 10 points "65 kg" of the weight graduations 8 when he stands upon the platform 2, as shown in FIG. 5, the calorie pointer 22 points "−170 cal" of the calorie graduations 54 and teaches that his weight will proceed to his standard weight "63.3 kg" if he reduces his diet calories by 170 calories every day.

EXAMPLE 3

If the man of Example 2 continues daily running of 3 kilometers, the knob 38 is rotated to set the running dial 36 at "3 km" as shown in FIG. 5. Then, the rotation of the knob 38 is transmitted by the pin 52 and arm 48 to the ring dial 28 to cause its counterclockwise rotation by an angle corresponding to 100 calories as aforementioned. Therefore, if the height setting is made as in the case of Example 2, the calorie pointer 22 will point "−70 cal" instead of "−170 cal". This teaches that his weight will proceed to his standard weight "63.3 kg" if he continues the 3 km running every day and, at the same time, reduces his daily diet calories by 70 calories.

The above description has been made for the specific examples and any person having any age, sex, height, weight or body form can be applied in the same manner. Although the method of determining the graduations of the various dials as abovementioned is believed to be useful and proper for general persons, different methods may be adopted on the basis of other theories of health control and sanitation without departing from the scope of this invention.

Moreover, various modifications can be made within the range of the invention. For example, while the dial 36 carries running distance graduations in the above examples, the graduations may be of other kinds of units suitable for representing the amount of physical exercise other than running, such as the number of times of rope-skipping. The calorie graduations 54 may be made on the basis of preferred daily diet calories instead of the difference therefrom. Furthermore, if the standard weight of everybody is otherwise obtainable easily, the height graduations may be omitted. Modifications in mechanical construction, such as concentric arrangement of the running dial 36 with the other dials, are within the range of selection for those skilled in the art.

What is claimed is:

1. A body weighing machine comprising means rotatably mounted on an axis for indicating measured weight, standard weight setting means rotatable about said axis for presetting a value relating to body form and height to indicate a standard weight and calorie indicating means including a scale carried by the first said means for indicating a value relating daily diet calories to be observed for proceeding to said standard weight, and means actuated by said standard weight setting means to modify the calorie indicating means and provide a calorie indication related to the difference between said measured weight and standard weight, said means for indicating measured weight and standard weight, said means for indicating measured weight including a first rotatable annular member carrying first weight graduations and means displacing said member an amount proportional to said measured weight, said standard weight setting means including a second rotatable annular member carrying second weight graduations about a portion of its periphery and height graduations about another portion of its periphery and a third fixed annular member concentric to the first and second annular members and carrying a pointer facing said second weight graduations and a plurality of body type indications, said pointer indicating a standard body weight when a selected height indication is aligned with a selected body type indication and said calorie indicating means including calorie graduations carried on said first annular member and having relation of diet calorie-to-weight change with respect to said first weight graduations, and a calorie pointer carried by said second rotatable annular member and facing said calorie graduations.

2. A body weighting machine comprising means responsive to a displacement proportional to and indicating measured weight, standard weight setting means for presetting a value relating to standard weight and calorie indicating means for indicating a value relating daily diet calories to be observed for proceeding to said standard weight, and means actuated by said standard weight setting means to modify the calorie indicating means and provide a calorie indication related to the difference between said measured weight and standard weight, said machine further comprising exercise amount setting means for presetting a value relating to the amount of daily physical exercise, and correcting means coupling said standard weight setting means and exercise amount setting means for reducing calorie indication of said calorie indicating means by consumed calories corresponding to the present amount of exercise.

3. A body weighing machine according to claim 2 wherein said calorie indicating means includes a scale and a cooperating pointer, said exercise amount setting means includes a movable member displaceable to indicate the amount of daily physical exercise, and said correcting means include a mechanism for moving said calorie pointer in the direction of reduction with respect to said calorie graduations by the amount of calories consumed by the amount of exercise corresponding to the displacemnt of said movable member.

4. A body weighing machine comprising means including a first dial rotatable about an axis in response to the weight of a body and carrying weight graduations about the periphery thereof to indicate weight of an individual and calorie indications concentric with and spaced inwardly of said weight graduations, a second dial rotatable about said axis having ideal weight graduations about one portion of the periphery, height graduations about another portion of the periphery and a window including a calorie marker at still another portion of the periphery to display the calorie indications, a third dial overlying said second dial and of smaller diameter and carrying body form indications and a pointer whereby adjustment of said second dial to align the body form with height on said second dial will shift the calorie marker and shift the pointer to indicate the ideal body weight whereupon said weighing machine will display the body weight of an individual and the calorie change in the diet to achieve the desired body weight.

* * * * *